P. WALLACE.
MEANS FOR SEPARATING SMALL FROM LARGE FISH
APPLICATION FILED MAR. 21, 1919.
1,328,551. Patented Jan. 20, 1920.
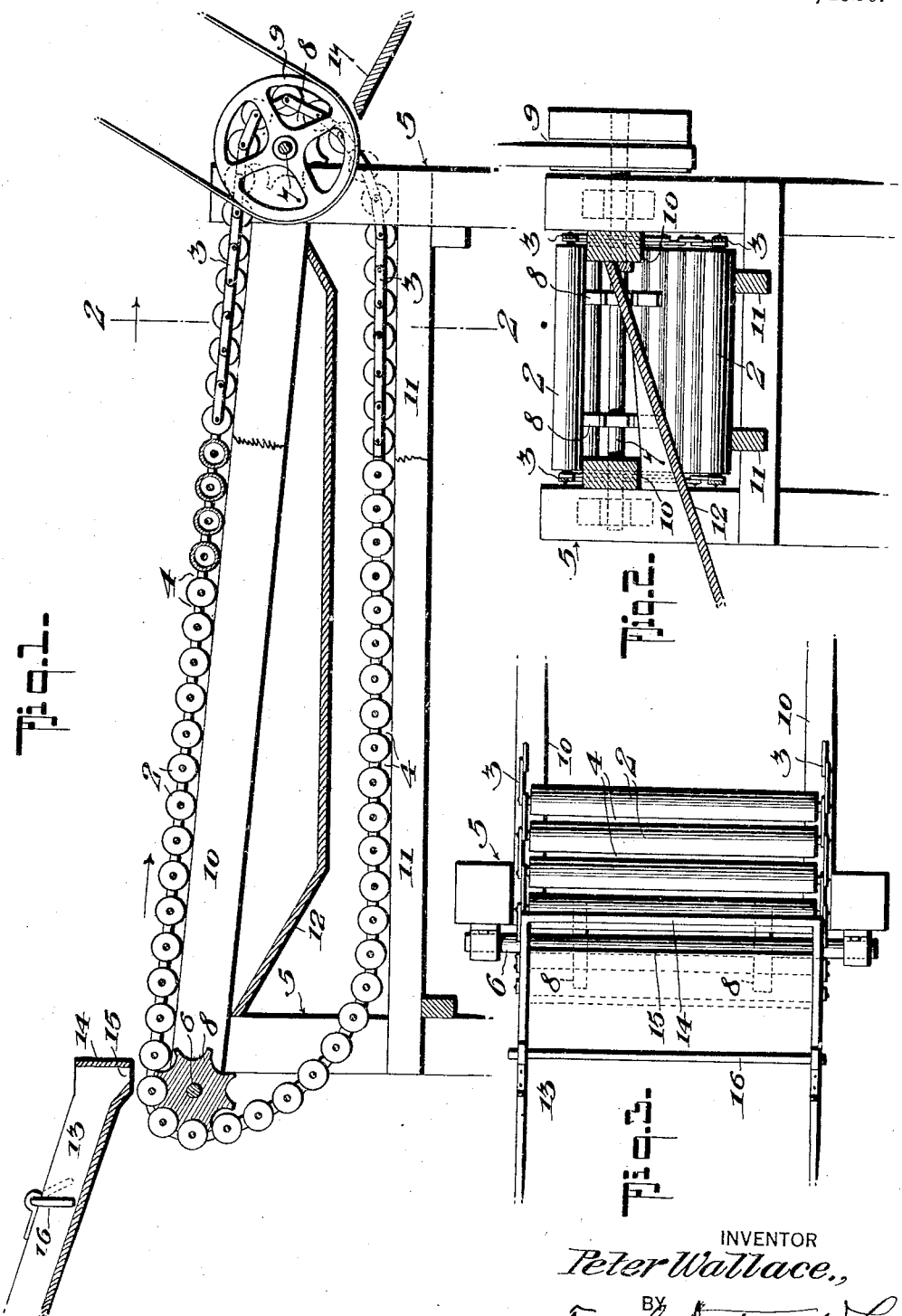
INVENTOR
Peter Wallace.,
BY
Fred G. Dieterich
ATTORNEYS

UNITED STATES PATENT OFFICE.

PETER WALLACE, OF VANCOUVER, BRITISH COLUMBIA, CANADA.

MEANS FOR SEPARATING SMALL FROM LARGE FISH.

1,328,551. Specification of Letters Patent. Patented Jan. 20, 1920.

Application filed March 21, 1919. Serial No. 284,117.

*To all whom it may concern:*

Be it known that I, PETER WALLACE, a citizen of the Dominion of Canada, residing at Vancouver, in the Province of British Columbia, Canada, have invented certain new and useful Improvements in Means for Separating Small from Large Fish, of which the following is a specification.

This invention relates to a means for separating small from larger fish and has been particularly designed to separate the smaller herring of a catch from the larger.

The invention is fully described in the following specification, reference being made to the drawings by which it is accompanied, in which:

Figure 1 is a side elevation and part longitudinal section of the separating device.

Fig. 2 is a cross section of the same on the line 2—2 in Fig. 1, and

Fig. 3 is a plan of the delivery chute onto the separating conveyer.

The device comprises a traveling conveyer formed of transverse cylindrical rollers 2 which are connected together and maintained parallel at the required distance apart by side chains 3, in which side chains the pins of the rollers are free to rotate. The interspace 4 between each pair of rollers represents the limit of thickness of the fish which it is desired to reject.

This endless conveyer 2, 3 is mounted on roller engaging sprockets 8 secured on transverse shafts 6 and 7 mounted on each end of a suitable frame 5, to carry the upper side of the conveyer either horizontal or, as shown in Fig. 1 of the drawing, at a slight downward grade. It is driven from any convenient source of power by a belt over a pulley 9 secured on the end of one of the transverse shafts 7.

Between the sprockets 8 the upper length of the conveyer is supported on straight track bars 10 lengthwise disposed between the ends of the frame 5, and the lower length is carried by similar track bars 11 horizontally disposed.

In the loop of the conveyer 2, 3, that is beneath the upper side of it, is a hopper or chute 12 to receive all under-sized fish, which fall through between the rollers 2.

The fish are delivered to the conveyer down an inclined chute 13 having side walls, and in order that the fish may be fed to the conveyer with their length across the line of its forward movement, that is, parallel with the axes of the rollers 2, a stop board 14 extends across the lower end of the chute 13 adjacent the relatively narrow delivery aperture 15, which also extends across the width of the chute. Thus, the leading ends of any fish that are inclined to the transverse line as they come down the chute 13, will encounter the end board 14 and they will rectify themselves therewith to pass through the aperture 14 into the pockets or spaces 4 between the rollers.

To assist this rectification of the fish across the direction of movement of the conveyer, the chute may have one or more gates 16 swinging from the upper edges of the chute and extending almost to the bottom of it, which will have the same tendency as the end board 14 to turn the fish across.

Thus, the fish as delivered from the chute 13 to the conveyer 2, 3 are rectified that they may lie along the rollers 2. As they are carried along to the other end any fish, which are under-sized, will pass through between the rollers into the chute 12 beneath, or into a receptacle provided, while the full-sized fish are carried along by the conveyer and are delivered at 17 for such further treatment as may be required.

As the rollers 2 are supported by the track bars 10, they are rotated by contact therewith, and as the adjacent sides of the rollers travel in opposite directions, if the fish do not drop freely through, there is no tendency on the part of the rollers to draw them through. The opposite rotation of the sides of adjacent rollers will also turn any fish that may be on their sides onto their edges that they may be gaged by the space 4 between the rollers.

I do not desire to be confined to the particular form of conveyer, side chains 3 and roller engaging sprockets 8 illustrated in the drawings herewith, as any suitable sprocket chain may be used and the conveyer be driven by sprocket wheels engaging the links of the chain.

Having now particularly described my invention, I hereby declare that what I claim as new and desire to be protected in by Letters Patent, is:

1. A means for separating under-sized fish from those of full size, said means comprising an endless conveyer of transverse rollers rotatably mounted at the required distance apart between side chains to provide parallel interspaces between them, said rollers traveling along track bars to rotate the rollers, means for delivering the fish and arranging them with their length parallel to the rollers, means for receiving the undersized fish that pass through between the rollers, and means for receiving the full sized fish at the other end of the conveyer.

2. A device as set forth in claim 1, the means for delivering the fish to the conveyer having a board across its lower end, and a relatively narrow slit parallel to the end board.

3. A device as set forth in claim 2 in which the delivering chute is provided with a gate swinging from its upper edge across the chute.

In testimony whereof I affix my signature.

PETER WALLACE.